United States Patent
Murray

(10) Patent No.: US 11,248,825 B2
(45) Date of Patent: Feb. 15, 2022

(54) TANK TEMPERATURE PROBE WITH POSITIONAL SENSOR

(71) Applicants: Bosch Automotive Service Solutions Inc., Warren, MI (US); Robert Bosch GmbH, Stuttgart (DE)

(72) Inventor: Gary Murray, Montpelier, OH (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 620 days.

(21) Appl. No.: 16/107,223

(22) Filed: Aug. 21, 2018

(65) Prior Publication Data

US 2019/0063804 A1 Feb. 28, 2019

Related U.S. Application Data

(60) Provisional application No. 62/551,810, filed on Aug. 30, 2017.

(51) Int. Cl.
*F25B 45/00* (2006.01)
*F25B 43/04* (2006.01)
(Continued)

(52) U.S. Cl.
CPC ............ *F25B 43/043* (2013.01); *F25B 45/00* (2013.01); *G01D 5/145* (2013.01); *G01H 13/00* (2013.01); *G01K 1/143* (2013.01); *F17C 13/02* (2013.01); *F17C 13/026* (2013.01); *F17C 2250/03* (2013.01); *F17C 2250/04* (2013.01); *F17C 2250/0404* (2013.01); *F17C 2250/0439* (2013.01); *F17C 2250/0465* (2013.01); *F17C 2250/0478* (2013.01);
(Continued)

(58) Field of Classification Search
CPC .. F25B 43/043; F25B 45/00; F25B 2345/002; F25B 2345/003; F25B 2345/0051; F25B 2345/0052; G01H 13/00; G01H 1/06; G01D 5/145; G01D 5/142; F17C 13/02; F17C 13/026; F17C 2250/04; F17C 2250/0404; F17C 2250/0439; F17C 2250/0465; F17C 2250/0478; G01K 2201/00; G01K 2215/00; G01N 2291/02881; G21K 5/08
See application file for complete search history.

(56) References Cited

U.S. PATENT DOCUMENTS 2,779,810 A * 1/1957 Horbinski ............... G01K 1/143
136/221
4,294,263 A * 10/1981 Hochman ............... A61B 18/16
600/549

(Continued)

FOREIGN PATENT DOCUMENTS

CN 102854478 A * 1/2013
JP 358017326 A * 2/1983

*Primary Examiner* — Gail Kaplan Verbitsky
(74) *Attorney, Agent, or Firm* — David Kovacek; Maginot, Moore & Beck LLP

(57) ABSTRACT

A sensor device, system, and method for monitoring the internal pressure and temperature of a refrigerant tank during a recovery operation to control a purge operation of the tank based on the conditions thereof during the recovery operation. The sensor device, system, and method further (Continued)

utilize an external temperature sensor, the external temperature sensor operable to indicate that it is properly positioned on the surface of the tank.

9 Claims, 2 Drawing Sheets

(51) Int. Cl.
  *G01K 1/143* (2021.01)
  *G01D 5/14* (2006.01)
  *G01H 13/00* (2006.01)
  *G01H 1/06* (2006.01)
  *G01K 1/20* (2006.01)
  *F17C 13/02* (2006.01)

(52) U.S. Cl.
  CPC ... *F25B 2345/002* (2013.01); *F25B 2345/003* (2013.01); *F25B 2345/0051* (2013.01); *F25B 2345/0052* (2013.01); *G01D 5/142* (2013.01); *G01H 1/06* (2013.01); *G01K 1/20* (2013.01); *G01K 2201/00* (2013.01); *G01K 2215/00* (2013.01)

(56) References Cited

U.S. PATENT DOCUMENTS

| | | | | |
|---|---|---|---|---|
| 4,295,475 A | * | 10/1981 | Torzala | A61B 5/14552 600/549 |
| 4,399,824 A | * | 8/1983 | Davidson | G05D 23/24 600/549 |
| 5,803,915 A | * | 9/1998 | Kremenchugsky | G01K 1/16 600/549 |
| 7,096,679 B2 | | 8/2006 | Manole | |
| 8,261,564 B2 | * | 9/2012 | Brown | F25B 45/00 62/149 |
| 2007/0009010 A1 | * | 1/2007 | Shio | G01K 11/125 374/161 |
| 2009/0119051 A1 | * | 5/2009 | Murray | G01G 23/01 702/101 |
| 2014/0376597 A1 | * | 12/2014 | Gilley | G01K 1/14 374/208 |
| 2015/0153083 A1 | | 6/2015 | McMasters et al. | |
| 2016/0033184 A1 | | 2/2016 | Fountain et al. | |
| 2021/0095893 A1 | * | 4/2021 | Furmanek | F24H 9/0026 |

* cited by examiner

TANK TEMPERATURE PROBE WITH POSITIONAL SENSOR

CROSS-REFERENCE TO RELATED APPLICATION

This application claims the benefit of U.S. Provisional Application Ser. No. 62/551,810, filed Aug. 30, 2017, and which is hereby incorporated herein by reference in its entirety.

TECHNICAL FIELD

This disclosure relates to the field of recovering refrigerant from an air conditioner into refrigerant tanks, and more specifically to the monitoring of the conditions of a refrigerant tank during recovery in order to determine when a purge operation is appropriate.

BACKGROUND

During the recovery or recycling of refrigerant, non-condensables (typically air) may end up in the refrigerant storage tank. Reducing non-condensables from the storage tank can be achieved using a purge operation.

The most reliable and economical way to purge air from the tank is to measure pressure and temperature of the refrigerant mixture within a storage tank, compare the measurements to a standard refrigerant saturation table indicating what a pure refrigerant pressure would be at that temperature, and when the actual pressure of the refrigerant mixture within the tank is above the saturation level, indicating unacceptable non-condensable presence, purge the non condensables from the tank via the vapor valve until the storage tank is reduced to the proper pressure. Having sensors disposed outside of the tank improves the versatility of the system by making it compatible with standard conventional tanks that do not have internal temperature sensors. Pressure transducers can be disposed within the recovery system at any point having direct fluid communication with the tank. Temperature sensors can be placed on the surface of the tank, but with inaccuracy if not placed correctly. What is needed is a system that provides for the proper and accurate placement of an external temperature sensor and then an automated approach for determining proper placement of an external temperature sensor for storage tank non-condensable purging.

SUMMARY

One aspect of this disclosure is directed to a system for recovering refrigerant from an air conditioner, the system being operable to monitor the pressure and temperature of the tank in order to control a purge operation during the recovery. The system herein uses a pressure transducer and a temperature probe disposed outside of the tank. In this aspect, a magnetic element is used to couple the tank multi-sensor to the surface of the storage tank, and a positional sensor is used to indicate if the temperature sensor is within operable range to measure the temperature of the surface of the tank.

Another aspect of this disclosure is directed to an external tank sensor device for determining the interior temperature of for a storage tank having a ferrous construction. The external tank sensor having a temperature sensor placed in contact with a surface of the tank. The external tank sensor also having a positional sensor to indicate whether the temperature sensor is in the operable range of the surface of the storage tank.

In this aspect, the positional sensor may be a magnetic switch. The magnetic switch may be one of a normally-open magnetic reed switch, a normally-closed magnetic reed switch, a normally-open magnetic switch, or a normally-closed magnetic switch. Alternatively, in this aspect, the positional sensor may be one of a physical actuator, a Hall-effect sensor, a sonic sensor, or an optical sensor. Or the positional sensor may be configured to indicate that the sensor device is in operable range to the surface of the storage tank when the temperature sensor is in direct contact with the surface of the storage tank. Still yet, the positional sensor may be a vibration sensor, the vibration sensor configured to determine the resonance of the surface to which the sensor device is coupled, and wherein the positional sensor indicates that the temperature sensor is within operable range of the surface of the storage tank only when the determined resonance matches known resonances of a storage tank.

Another aspect of this disclosure is directed to the method of monitoring the conditions of a storage tank filled with a refrigerant mixture in order to properly identify conditions requiring a purge of impurities from the refrigerant mixture, if so desired, and also to active the purge operation, if so desired. This method employs generating positional data with a positional sensor corresponding to a placement of a temperature sensor on an exterior of the storage tank as a way to ensure the temperature sensor is properly placed, so as to increase the confidence that the measured temperature is related to the temperature of the refrigerant mixture within.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
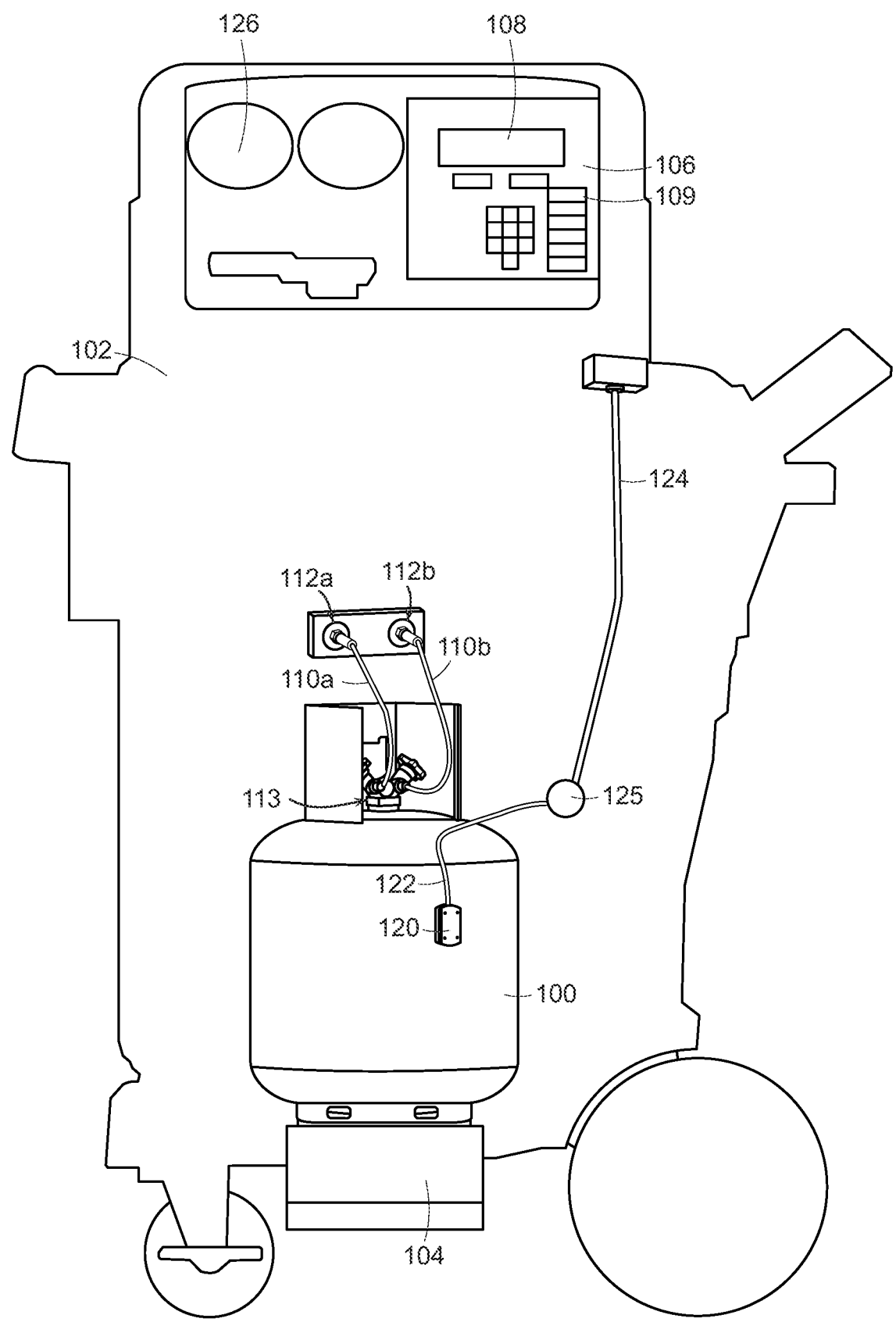
FIG. 1 is a diagrammatic illustration of a refrigerant recovery system having a refrigerant storage tank and a temperature sensor properly connected to an exterior of the storage tank.

FIG. 1 shows an embodiment of a system for recovering the refrigerant from an air conditioner (not shown). The shown embodiment comprises a tank 100 and a service cart 102 operable to perform a tank fill operation as part of the recovery operation. Service cart 102 comprises a scale 104 operable to monitor the weight of tank 100 during the recovery operation. Service cart 102 further comprises a controller 106 having a display 108 operable to provide a user interface for controlling the operations of the system. In the depicted embodiment, service cart also has a timer display 109 which reflects the internal timer of the electronic components of the service cart. Tank 100 is in fluid communication with service cart 102 via hoses 110a, 110b. Hoses 110a, 110b connecting service ports 112a, 112b of service cart 102 to a Y-valve 113 of tank 100.

Coupled to the surface of tank 100 is a tank sensor 120, which is configured to provide data signals, including temperature measurements, to controller 106 via electrical connection 122. In the embodiment shown, electrical connection 122 is further supported by connection arm 124, which provides protection and strain relief for electrical connection 122. In the shown embodiment, tank sensor 120 is further limited in its placement upon the surface of tank 100 by an arm joint 125. In the shown embodiment, controller 106 is additionally coupled to an ambient sensor 126 configured to provide temperature measurements of the ambient environment of the system.

In the embodiment shown, electrical connection 122 is a hardwire connection, though other embodiments are contemplated, including wireless connections utilizing protocols known within the art such as those conforming to a Bluetooth specification, a Zigbee specification, or a Wi-Fi specification. A hardwire embodiment, like that depicted in FIG. 1, has several advantageous features.

A first advantage of a hardwire embodiment is that tank sensor 120 can be powered by the controller 106 through electrical connection 122, rather than requiring an alternate source of energy such as an internal battery. Additionally, tank sensor 120 can be produced less expensively because it does not require an alternate source of energy or specialized wireless transmission hardwire.

Another advantage of a hardwire embodiment is that tank sensor 120 is tethered to other portions of the system. In the depicted embodiment, tank sensor 120 is tethered to controller 106, but other configurations would be recognized by one of ordinary skill in the art. In a wireless embodiment, tank sensor 120 would be more susceptible to being lost or damaged after separation from the rest of the system. Tethering provides the additional advantage of ensuring that tank sensor 120 is only connected to the particular storage tank that is coupled to the service cart 102 and resting upon scale 104. In facilities with multiple storage tanks, hardwired embodiments of tank sensor 120 ensure that it can only provide to controller 106 the temperature measurements of tank 100 actively used by the service cart 102 in a recovery operation, rather than providing the false temperature measurements of another storage tank in the facility not actively undergoing a recovery operation. Thus, a hardwire embodiment limits undesired purging of refrigerant caused by false measurements.

A further advantage of a hardwire embodiment is that electrical connection 122 can be designed in coordination with connection arm 124 and arm joint 125 such that tank sensor 120 can be limited in its placement on tank 100 to locations providing accurate temperature measurements. The accuracy of the temperature measurements of tank sensor 120 can depend upon its placement on the surface of tank 100. Standard conventional tanks may be constructed of ferrous metals. Because metals are excellent thermal conductors, the temperature of large portions of a standard conventional tank's surface will correspond to the temperature of the contents thereof. The recovery operation increases the amount of refrigerant within tank 100, thus increasing the internal pressure and the temperature therein.

However, standard conventional storage tanks may comprise portions of the surface thereof that do not reflect the temperature of the internal contents of the storage tank. Such portions may be a base section or a handle section of the tank. One of ordinary skill in the art will recognize that deliberate design of electrical connection 122, connection arm 124 and arm joint 125 can limit the placement of tank sensor 120 only to portions of the surface of tank 100 that reflect the temperature of the contents thereof.

Connection arm 124 provides protection and strain relief for electrical connection 122. Connection arm 124 may be embodied as a conduit, a rigid structure having wires therein, a flexible structure having wires therein, a specialized structure, or any other alternative equivalent recognized by one of ordinary skill in the art. Arm joint 125 provides motion along a number of degrees of freedom for at least a portion of electrical connection 122 or connection arm 124. Arm joint 125 may be embodied as a hinge, swivel, ball-and-socket, flexible tubing, or any other alternative equivalent recognized by one of ordinary skill in the art.

Alternative embodiments of the system are contemplated. Tank 100 is depicted as a standard conventional storage tank having a 50-pound capacity, but other tank sizes may be used. Controller 106 is depicted as an electronic processing device disposed upon service cart 102, but may also be embodied as an independent processing device. Controller 106 may further be embodied as a specialized processor, a portable processor device, a tablet processor device, a smartphone, a general-purpose processor comprising software, a general-purpose processor comprising firmware, or any combination thereof known to one of ordinary skill in the art. Alternative embodiments of the system, e.g., those having a wireless configuration of tank sensor 120, may not comprise connection arm 124, or arm joint 125.

Figure 2:
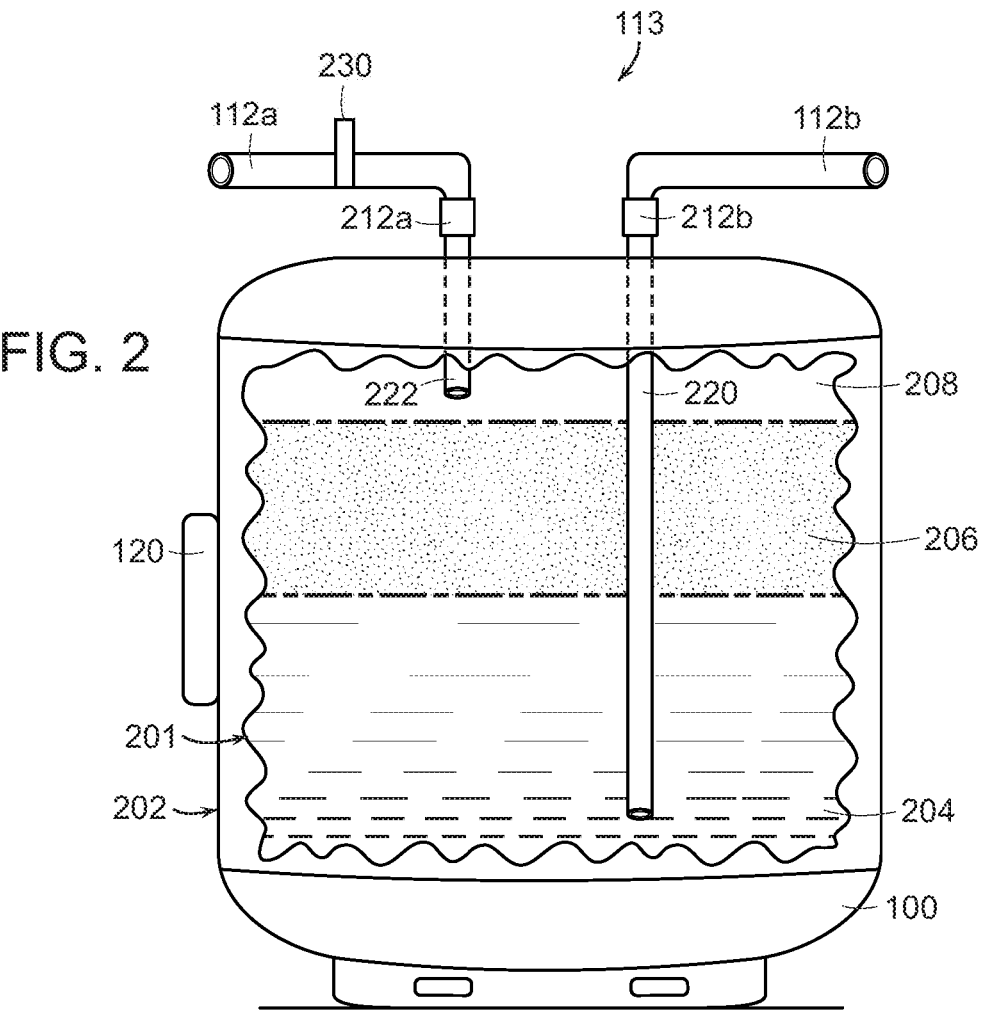
FIG. 2 is a diagrammatic illustration of a storage tank showing a refrigerant mixture contained therein.

FIG. 2 represents a diagrammatic illustration of tank 100 having a refrigerant mixture therein. During a recovery of refrigerant from an air-condition system, refrigerant is added to the interior portions of tank 100, such as in liquid form and via a liquid port 220, though gaseous refrigerant and/or a gaseous port 222 may also be used. In one embodiment, liquid port 220 and gaseous port 222 are disposed within Y-valve 113 (see FIG. 1). Because gaseous refrigerant is denser than non-condensable impurities (such as air), the contents within the interior of tank 100, denoted here as tank interior 201, naturally form three strata comprised of liquid refrigerant in liquid layer 204, gaseous refrigerant in gaseous layer 206, and non-condensable gases such as air in non-condensable layer 208. Although each of the strata are depicted as perfectly delineated in this diagrammatic view, in practice each layer blends into an adjacent layer with some level of mixture of their respective contents, forming a blended boundary region.

Disposed outside of tank 100 and Y-valve 113 are a number of pressure transducers 212. In FIG. 2, two pressure transducers 212a and 212b are depicted, though other embodiments may have a different number. Pressure transducers 212 are disposed within the system within fluid communication of the tank interior 201, such that they may accurately measure the pressure of tank interior 201, such as between service ports 112a, 112b and Y-valve 113. In one embodiment, pressure transducers 212 comprise a single transducer disposed in fluid communication with gaseous port 222 located within a service cart behind a service port 112a. Pressure transducers 212a, 212b may be disposed within one of hoses 110 (see FIG. 1). Tank sensor 120 is coupled to a tank surface 202 of tank 100.

In the depicted diagrammatic view, gaseous port 222 is coupled to a purge valve 230. In some embodiments, purge valve 230 is disposed within a third port of Y-valve 113 that is in fluid communication with tank interior 201 at a point higher than the gaseous port 222. Purge valve 230 is operable to open during the recovery process to purge non-condensable impurities. Purge valve 230 may be controlled by controller 106 (see FIG. 1), and may be implemented as a solenoid valve, though other configurations are contemplated.

In an example of a recovery operation using the disclosed system, refrigerant in gaseous form is sent into tank 100 via gaseous port 222 after interior 201 is held in a near-vacuum state. Although in this example, interior 201 is held in a near-vacuum state, some embodiments may include a partially-filled tank 100 having interior 201 under pressure without departing from the teachings herein. Tank sensor 120 measures the temperature of tank 100 at surface 202 and provides the measurements to controller 106 (see FIG. 1). Pressure transducers 212 measure the pressure of the contents of the interior 201 and provide the measurements to controller 106. Controller 106 compares the temperature measurements relative to the pressure measurements to a set of known conditions indicating excess of non-condensable impurities. If the temperature measurements and pressure measurements match known values in an excess-impurity condition, controller 106 performs a purge operation by opening purge valve 230 to vent non-condensable impurities until the temperature measurement of tank sensor 120 relative to the pressure measurement of pressure transducer 112 no longer indicate an excess-impurity condition. When the excess-impurity condition is no longer indicated, controller 106 closes purge valve 230. Purge valve 230 is shown here in fluid communication with the gaseous port, however purge valve 230 may be in fluid connection with the top of the tank interior 201 through another dedicated purge port not shown here.

Figure 3:
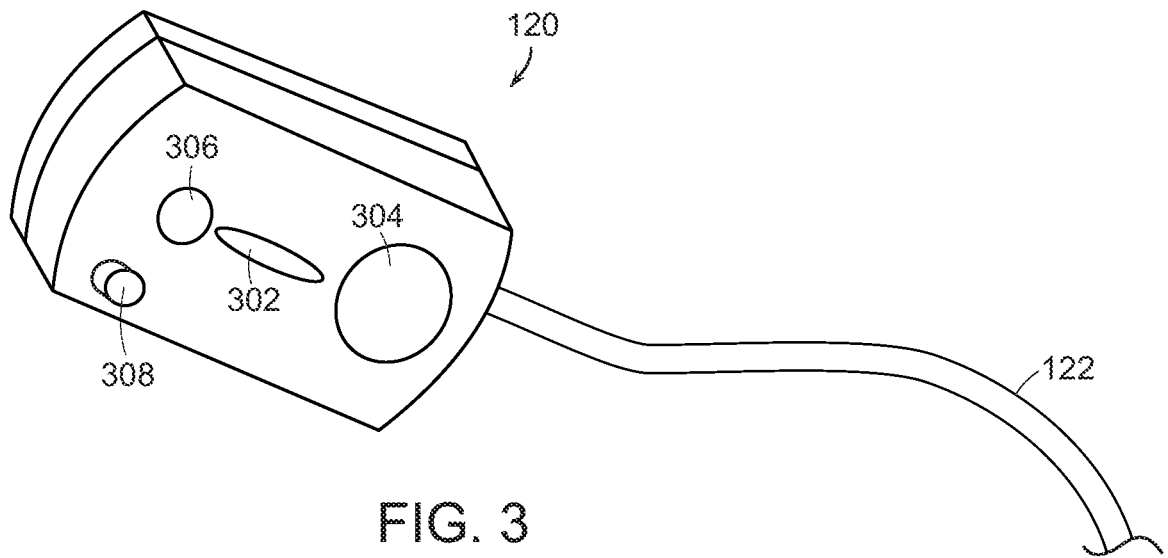
FIG. 3 is a close-up view of one embodiment of a tank sensor described herein.

FIG. 3 shows a close-up view of an embodiment of tank sensor 120 having electrical connection 122 embodied as a hardwire connection to controller 106 (see FIG. 1). Because tank sensor 120 is disposed outside tank interior 202 (see FIG. 2), there are a number of improvements disclosed herein to ensure that it provides an accurate temperature measurement.

Tank sensor 120 is designed to be detachably coupled to tank 100 (see FIGS. 1 and 2) such that a temperature probe 302 is in operable range of the surface of tank 100. In the shown embodiment, temperature probe 302 is a conduction sensor, but other embodiments may be used such as a convection sensor, a radiation sensor, or any other equivalent alternative known to one of ordinary skill in the art. The operable range of temperature probe 302 embodied as a conduction sensor is direct contact with the surface of tank 100, but other embodiments may have a different operable range. Because temperature probe 302 is disposed outside of tank 100, a direct measurement of temperature inside tank 100 is not possible. Instead, temperature probe 302 may be configured and calibrated with respect to the surface of tank 100 such that the measurements of the internal temperature of tank 100 are accurate to within a specified temperature range.

In the shown embodiment, the placement of temperature probe 302 within operable range uses a magnet 304 to provide a detachable coupling of tank sensor 120 with a ferrous tank. Other embodiments may be used, such as a strap mechanism or placement of connection arm 124 being limited by a positioning mechanism such as arm joint 125 (see FIG. 1). Magnet 304 may be a permanent magnet, an electromagnetic, or any other alternative equivalent known to one of ordinary skill in the art. Because standard conventional tanks are made of ferrous materials, the use of magnet 304 is advantageous because placement of tank sensor 120 may be accomplished reliably and with one hand.

In the shown embodiment, tank sensor 120 also has a positional sensor 306. Positional sensor 306 provides an indication to controller 106 of whether temperature sensor 302 is within operable range to measure the temperature of a storage tank. In one embodiment, controller 106 will be unable to initiate a purge action unless positional sensor 306 indicates that tank sensor 120 is within the operable range of the surface of a storage tank. Advantageously, this will prevent false temperature measurements from initiating an unnecessary purge resulting in lost refrigerant. In an alternative embodiment, tank sensor 120 may transmit the status of positional sensor 306 to controller 106, and controller 106 may prevent a purge action if the status indicates that temperature sensor 302 is not within operable range of the surface of tank 100.

In the embodiment of FIG. 3, positional sensor 306 is a magnetic switch indicating contact or proximity to a ferrous material, such as the surface of a tank. In some embodiments, positional sensor 306 may rely upon magnet 304, but as depicted in FIG. 3 positional sensor 306 makes use of its own magnet.

Controller 106 may be configured such that it is unable to initiate a purge operation unless positional sensor 306 indicates that temperature sensor 302 is within operable range of the surface of tank 100 (see FIG. 1). Controller 106 may further be configured to provide an indication to the user, such as an error message, if positional sensor 306 indicates temperature sensor 302 is not within operable range of the surface of tank 100. Positional sensor 306 may be embodied as a magnetic switch, such as a normally-open magnetic reed switch, a normally-closed magnetic reed switch, a normally-open magnetic switch, a normally-closed magnetic switch, or any other equivalent embodiment recognized by one of ordinary skill in the art.

FIG. 3 also depicts a confirmation sensor 308. Confirmation sensor 308 is an alternative sensor to indicate the coupling status of tank sensor 120 to a tank, and may be embodied instead of or in combination with positional sensor 306. Controller 106 may be configured such that it is not operable to initiate a purge operation unless confirmation sensor 308 indicates that tank sensor 120 is operably coupled to tank 100 (see FIG. 1). Controller 106 may further be configured to provide an indication to the user, such as an error message, if confirmation sensor 308 indicates that tank sensor 120 is not operably coupled to tank 100. Confirmation sensor 308 may be comprised of one of the embodiments of positional sensor 306, or may be embodied as a solid state Hall Effect sensor, an optical sensor, a sonic sensor, a vibration sensor, a physical actuator switch, or any other equivalent embodiment recognized by one of ordinary skill in the art.

A contemplated advantage of confirmation sensor 308 being embodied as a sonic sensor or a vibration sensor is that because tank 100 has different portions having different resonances (e.g., surface portions of the interior cavity will resonate differently than a handle portion), a sonic sensor or vibration sensor can be configured to operate at a desired resonant frequency. Because the resonance of the tank interior 201 depends on its volume and contents, the expected resonant frequency of a known tank filled with a particular weight of pure refrigerant is known. Thus, an embodiment of confirmation sensor 308 using a sonic sensor or vibration sensor can be used to determine the current resonance of tank interior 102 and provide the additional measurements to controller 106 in determining the saturation levels of the contents therein.

Controller 106 may also be configured to compare the temperature measurement provided by temperature probe 302 to those of ambient sensor 126 (see FIG. 1). During a recovery operation, the tank interior 201 is expected to increase in temperature as it is filled with refrigerant. Because the ambient environmental temperature is not expected to change as rapidly as the tank, controller 106 can compare the temperature measurements from tank sensor 120 with those ambient sensor 126. If the temperature measurements of tank sensor 120 correspond to the temperature measurements of ambient sensor 126 during a recovery operation, controller 106 may be configured to indicate that tank sensor 120 is not operably coupled to tank 100. Because an empty tank prior to a recovery operation is expected to be similar in temperature to the ambient environment, controller 106 may be configured to additionally compare the rate-of-change of temperature measurements. Controller 106 may be further configured to only compare temperature measurements after a predetermined time has passed during a recovery operation, or after tank 100 has achieved a particular weight during a recovery operation according to scale 104. Because ambient sensor 126 is configured to reflect the ambient environmental temperature, ambient sensor 126 is disposed away from tank 100 during the recovery operation. Referring back to FIG. 1, ambient sensor 126 is disposed within the user interface of controller 106, but other embodiments may be realized, such as ambient sensor 126 being disposed elsewhere on service cart 102, or disposed elsewhere in the ambient environment and connected wirelessly to controller 106, or any other alternative configuration recognized by one of ordinary skill in the art.

The disclosure herein is intended to be one of description and not limitation. Other embodiments for implementing the teachings herein will be recognized by one of ordinary skill in the art.

What is claimed is:

1. An external sensor device configured to determine an interior temperature of a storage tank having a ferrous construction, the device comprising:
    a temperature sensor configured to measure a surface temperature of the storage tank;
    a magnetic element operable to magnetically couple the sensor device to the storage tank such that the temperature sensor is in an operable range of the surface of the storage tank;
    a positional sensor operable to indicate whether the temperature sensor is in an operable range of the surface of the storage tank; and
    an electrical signal connection operable to transmit the temperature measurements of the temperature sensor according to the indication of the positional sensor, wherein the electrical signal connection only transmits the temperature measurements when the positional sensor indicates that the temperature sensor is operable range of the surface of the storage tank.

2. The sensor device of claim 1, wherein the electrical signal connection is configured to be in communication with a controller device operable to utilize temperature measurements, the electrical signal connection comprising a hard-wired connection between the sensor device and the controller device.

3. The sensor device of claim 2, wherein the sensor device, when in communication with the controller device, transmits temperature measurements to the controller device for utilization by an air conditioning service system.

4. The sensor device of claim 1, wherein positional sensor comprises a magnetic switch.

5. The sensor device of claim 4, where the magnetic switch comprises one of a normally-open magnetic reed switch, a normally-closed magnetic reed switch, a normally-open magnetic switch, or a normally-closed magnetic switch.

6. The sensor device of claim 1, wherein positional sensor comprises one of a physical actuator, a Hall-effect sensor, a sonic sensor, or an optical sensor.

7. The sensor device of claim 1, wherein the positional sensor is configured to indicate that the sensor device is in operable range of the surface of the storage tank when the temperature sensor is in direct contact with the surface of the storage tank.

8. The sensor device of claim 1, wherein the positional sensor comprises a vibration sensor, the vibration sensor configured to determine the resonance of the surface to which the magnetic element is coupled, and wherein the positional sensor indicates that the temperature sensor is within operable range of the surface of the storage tank only when the determined resonance matches known resonances of a storage tank.

9. The sensor device of claim 1, wherein the positional sensor comprises an ambient sensor, the ambient sensor configured to measure the temperature of the ambient environment, wherein the positional sensor indicates that the sensor device is properly coupled to the storage tank if the ambient sensor measurements do not correspond to the temperature sensor measurements.

* * * * *

UNITED STATES PATENT AND TRADEMARK OFFICE
CERTIFICATE OF CORRECTION

PATENT NO. : 11,248,825 B2
APPLICATION NO. : 16/107223
DATED : February 15, 2022
INVENTOR(S) : Murray It is certified that error appears in the above-identified patent and that said Letters Patent is hereby corrected as shown below:

In the Claims

In Claim 1, at Column 8, Lines 9-10: "the temperature sensor is operable range" should read --the temperature sensor is in the operable range--.

Signed and Sealed this
Fourteenth Day of June, 2022

Katherine Kelly Vidal
*Director of the United States Patent and Trademark Office*